United States Patent [19]

Hartman

[11] Patent Number: 5,608,393

[45] Date of Patent: Mar. 4, 1997

[54] DIFFERENTIAL GROUND STATION REPEATER

[75] Inventor: Randolph G. Hartman, Plymouth, Minn.

[73] Assignee: Honeywell Inc., Minneapolis, Minn.

[21] Appl. No.: 400,168

[22] Filed: Mar. 7, 1995

[51] Int. Cl.$^6$ .................................................. G08G 1/123
[52] U.S. Cl. ...................... 340/988; 340/947; 364/428; 364/429; 342/357; 342/358; 244/114 R
[58] Field of Search ........................... 340/988, 947; 364/428, 429, 660; 342/357, 358, 33, 34, 35, 457, 450, 463; 244/114 R; 455/7, 11.1, 9, 51.1

[56] References Cited

U.S. PATENT DOCUMENTS

| | | | |
|---|---|---|---|
| 4,083,009 | 4/1978 | Bickford et al. | 325/304 |
| 4,809,005 | 2/1989 | Counselman, III | 342/352 |
| 4,894,655 | 1/1990 | Joguet et al. | 340/988 |
| 5,359,521 | 10/1994 | Kyrtsos et al. | 340/988 |
| 5,361,212 | 11/1994 | Class et al. | 340/947 |
| 5,438,337 | 8/1995 | Aguado | 342/357 |

OTHER PUBLICATIONS

FAA Document revised May 10, 1994, Subject: Revision of Appendix F . . . RTCA/DO-217.

*Primary Examiner*—Jeffery Hofsass
*Assistant Examiner*—Benjamin C. Lee
*Attorney, Agent, or Firm*—Charles J. Ungemach

[57] ABSTRACT

A differential ground station repeater in which a plurality of transmitters are utilized to relay information to an aircraft from a single ground station situated to receive satellite information and to transmit the satellite and other information to the plurality of correction transmitters in which the transmitters utilize a single frequency but transmit at different described sub-time slots so that the aircraft may utilize the signal of any of the transmitters it may be receiving signals.

13 Claims, 2 Drawing Sheets

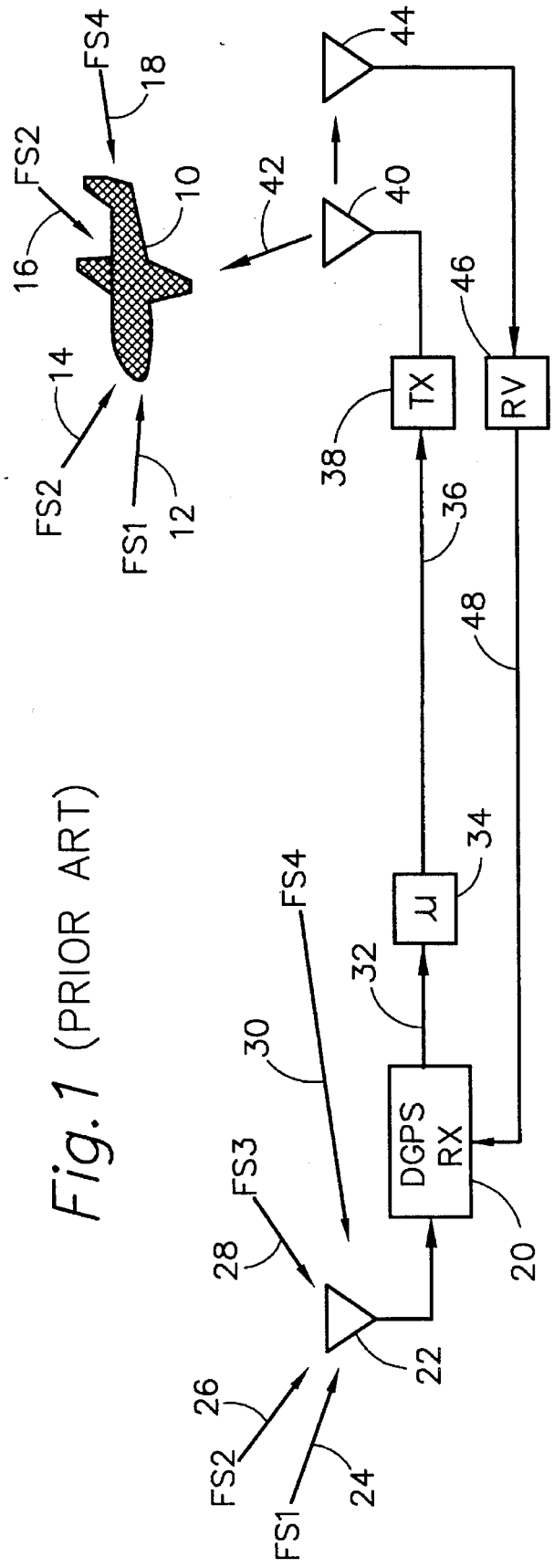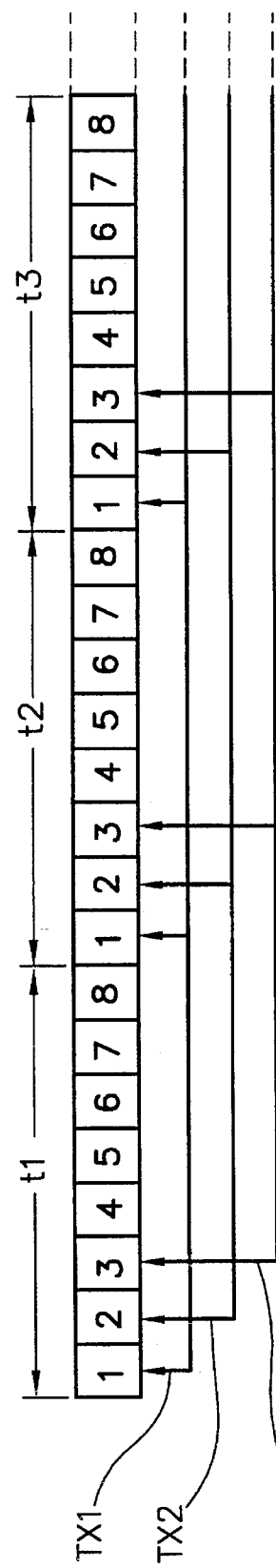
Fig. 1 (PRIOR ART)
Fig. 2 (PRIOR ART)

DIFFERENTIAL GROUND STATION REPEATER

BACKGROUND OF THE INVENTION

1. Field of the Invention

The present invention relates to ground station equipment for use with Differential Global Positioning Systems (DGPS) which utilize signals from a plurality of satellites to determine various parameters of aircraft operation such as position, attitude, velocity and the rates of change of these parameters and which provide correction information for satellite specific pseudo range errors.

2. Description of the Prior Art

GPS systems are well-known in the prior art. Examples of such prior are systems are U.S. Pat. No. 5,361,212 of the present assignee and 4,894,655 assigned to LMT Radiopreofessionnelle, of Boulogne Billancourt, France.

For simplicity a simple prior art system is shown herein in FIG. 1 in which an aircraft 10 is shown receiving signals from four remote satellites (FS1, FS2, FS3, and FS4) over paths shown by arrows 12, 14, 16 and 18 respectively. GPS receiver equipment aboard aircraft 10 can operate on the signals to determine the desired aircraft parameters (position, speed, attitude and the rates of change parameters etc.) useful in the navigation thereof. It is known, however, that because of various factors such as tropospheric and ionispheric distortions, the signals from the satellites may contain errors herein referred to as "satellite-specific pseudo range errors" which errors cause inaccuracies in the determination of the aircraft parameters. Accordingly, more advanced prior art systems have utilized DGPS receivers shown in FIG. 1 as box 20 having an antenna 22 located at a fixed position which is known with great accuracy. DGPS receiver 20 is shown as having a receiving antenna 22 which receives information from the satellites that are within it's view and, in the present case, from the four satellites FS1, FS2, FS3 and FS4 over paths shown as arrows 24, 26, 28 and 30. While a single antenna is shown in FIG. 1, more than one and preferably three antennas may be used so that multipath distortions caused by nearby objects (building, trees etc.) can be minimized. DGPS receiver 20 calculates the ranges as determined from the satellites signals and sends this information via a connection shown as arrow 32 to a microprocessor 34 which, knowing the actual position of the DGPS receiver, determines the satellite-specific pseudo range errors and produces information signals of these errors over a line shown as arrow 36 to a transmitter 38 having a transmitting antenna 40. Antenna 40 transmits the satellite-specific pseudo range error information to the aircraft 10 as shown by arrow 42 and also to a locally fixed antenna 44 connected to a receiver 46 which produces a signal back to the ground station 20 over the line shown as arrow 48 indicative of what was sent to aircraft 10. This feedback signal is referred to as a data link wraparound and is for the purpose of informing the ground station of the exact signal that was sent to the aircraft 10 as a check to make sure that the ground station system comprised of 22, 20, 32, 34, 36, 38, 40 is maintaining accuracy.

Aircraft 10 can thereafter utilize the now known error information to modify it's own calculations of the aircraft parameters so that it is assured that it's calculations are accurate.

Systems such as shown in FIG. 1 may be used near or at various airports around the world to direct aircraft in for landings and, after landing, to direct aircraft in a taxi mode over the ground paths to a terminal. This signal is useful for aircraft in a region within a 100 mile circle with the center located at the antenna 22.

Difficulties have been encountered with respect to ground station systems as shown in FIG. 1 because: 1) antenna 40 may not be able to see all portions of an aircraft landing site due to obstructions from buildings, natural surroundings and 2) when several airports are located in relatively close proximity to each other, the signals being transmitted to the aircraft cannot cover the entire region and 3) the current landing system (ILS) uses numerous frequencies in their band causing frequency congestion.

To solve this latter problem the FAA in a May 10, 1994 revision of Appendix F of a document DO-217 has defined requirements for the transmission of DGPS messages utilizing RTCA time slot allocation as shown in FIG. 2. In FIG. 2, three periods of transmission are shown as T1, T2 and T3 respectively and these are divided into a plurality, for example, 8 sub-time slots as identified by the Arabic numerals 1–8 in FIG. 2. FIG. 2 assumes that there are three different transmitters TX1, TX2, and TX3 that are sending information to an aircraft from locations which could overlap so that the aircraft could receive the transmissions simultaneously and, if they were at the same frequency, might possibly produce confusion. In order to use a single frequency, therefore, the FAA has proposed that the first transmitter TX1 transmit it's information only during the sub-time slot 1 in each period of transmission while transmitter TX2 transmits it's information to the aircraft only during sub-time slot 2 of each transmission period and transmitter TX3 transmits it's information only during the sub-time slot 3 of each transmission period. Obviously with eight sub-periods five more transmitters could be utilized in this system with all of them broadcasting on the same frequency with the aircraft avoiding confusion by knowing which transmitter is using which sub-time slot. To use the prior art systems in a plurality of locations requires a great deal of duplication of equipment.

BRIEF DESCRIPTION OF THE PRESENT INVENTION

The present invention proposes that instead of utilizing a plurality of ground stations, one at each of the locations, that a single ground station be utilized for the entire region. The present invention proposes that a data link be connected between the single ground station and each of the transmitters which, since they are all operating on the same frequency, may utilize the same information with the only difference being that the information transmitted to the receivers be transmitted into the appropriate time slot allotted for that transmitter. This has the great advantage of reducing the number of DGPS receivers involved thus saving a large amount of equipment and complexity. Furthermore, the system then allows the reduction in the number of data link wraparound antennas and receivers such as 44 and 46 in FIG. 1 since the only requirement is that the data link wraparound antenna be capable of receiving the signals from each of the transmitting antennas so as to provide the feedback signal to the ground station indicative of what was sent to the aircraft. This system also simplifies the airborne RX design when signals must be received from two transmitters, like during taxi guidance. This system can also increase system integrity for precision approach by providing dual active paths for transmission reliability which do not require a receiver frequency change.

BRIEF DESCRIPTION OF THE DRAWINGS

FIG. 1 shows a prior an ground station system;

FIG. 2 shows the suggestion proposed by the FAA for utilizing single frequency transmission from a multitude of transmitters by specific time slot allocation.

DETAILED DESCRIPTION OF THE PREFERRED EMBODIMENT

Figure 3:
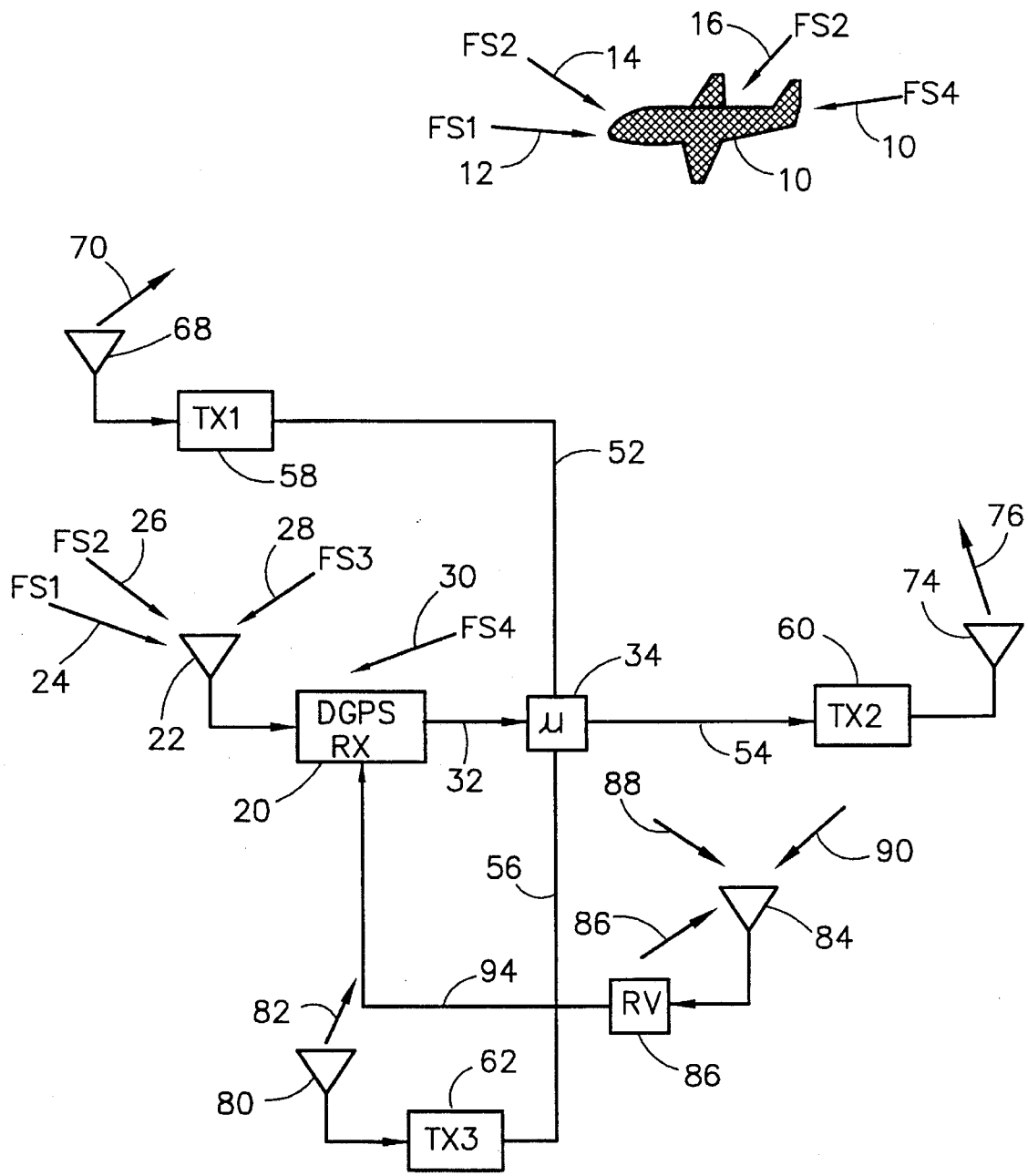
FIG. 3 shows a layout diagram of the present invention.

Referring to FIG. 3 an aircraft 10 which may be the same as aircraft 10 in FIG. 1 is shown receiving signals from the four satellites FS1, FS2, FS3 and FS4 over paths shown by arrows 12, 14, 16 and 18 as was the case in connection with FIG. 1. DGPS receiver 20 which may be the same as DGPS receiver 20 in FIG. 1 is shown at a fixed and known location and having a receiving antenna 22 receiving information from the satellites FS1, FS2, FS3 and FS4 over paths 24, 26, 28 and 30 just as was the case in connection with FIG. 1. As was the case in FIG. 1, DGPS receiver 20 produces a signal over a line shown as arrow 32 to a microprocessor 34 which calculates the satellite-specific pseudo range error signals and transmits this information over lines such as shown by arrows 52, 54 and 56 to remotely located transmitters TX1, TX2, and TX3 shown by boxes 58, 60 and 62 respectively. Transmission line 52, 54 and 56 may be hardwired, may be fiber optic or may be radio links whichever is most convenient under the circumstances. The remote transmitters 58, 60, and 62 may all be located at a single airport so as to provide unobscured vision of all of the aircraft from various angles to insure ground coverage or may be located at various airports around the general area to insure regional coverage. For example, if the range of transmission of the transmitters is considered to be 100 miles and if there are three large airports within that area, transmitter 58 may be located at the first of such airports, transmitter 60 may be located at the second of such airports and transmitter 62 may be located at the third of such airports. To avoid obscuration problems at the individual airports transmitter 58 may actually be two or more transmitters positioned at the single airport and the same may be true of transmitters TX2 and TX3. Accordingly, utilizing the FAA model as shown in FIG. 2, anywhere up to eight separate transmitters can be utilized to cover the area desired. Of course, if more than eight transmitters were needed, more frequencies would be required.

As was the case in FIG. 1, transmitter TX1 utilizing an antenna 68 transmits the satellite-specific pseudo range error information to the aircraft 10 as shown by arrow 70. Similarly, transmitter 60 utilizing an antenna 74 transmits the error information to the aircraft 10 as shown by arrow 76 and transmitter 62 utilizing an antenna 80 transmits the error information to aircraft 10 as shown by arrow 82. All of the antennas 68, 74 and 80 utilize the same frequency but utilize different sub-time slots as shown in FIG. 3. Accordingly, aircraft 10 receives signals from any one or all of these sources on a single frequency and can determine which transmitter is sending the signals and, thus, can utilize the information to provide the accurate determination of the aircraft parameters it needs.

In order to provide the data link wraparound, an antenna shown in FIG. 3 as antenna 84 may be located in a position to receive the transmissions from all of the antennas 68, 74 and 80 over paths shown by arrows 86, 88 and 90 respectively. In most cases a single antenna may be used for this purpose but if this is not the case more than one antenna may be employed. The signals received by antenna 84 are connected to receiver 86 and are transmitted back to the ground station 20 via a connection shown as arrow 94.

It is thus seen that I have provided a ground station repeater for a differential GPS system which minimizes the number of ground stations required and yet allows the use of a single frequency for transmission even in situations where more than one transmitter is sending signals to the aircraft at the same time.

Many changes to the apparatus described in connection with the preferred embodiment will occur to those skilled in the art and I, therefore, do not wish to be limited by the specific disclosure used in connection with the preferred embodiment but wish only to be limited by the following claims.

The embodiments of the invention in which an exclusive property or right is claimed are defined as follows:

1. A differential global position system for use in determining one or more parameters of an object with respect to earth by use of information transmitted to the object from a plurality of satellites which information may contain errors due to path distortions, comprising:

a ground receiving station fixed to earth at a known location and including a receiver to receive the information from the satellites and a microprocessor to determine the error information due to path distortion;

first transmitter means located at a first position remote from the receiver and connected thereto to receiver the error information and to transmit it to the object in a transmission at a first frequency with a first characteristic; and second transmitter means located at a second position remote from the first transmitter means and the receiver and connected to the receiver to receive the error information and to transmit it to the object in a transmission at the first frequency with a second characteristic distinguishable from the first characteristic, so that the transmissions are individually distinguishable.

2. Apparatus according to claim 1 further including a data link wrap around receiving antenna positioned to receive the transmissions from the first and second transmitters and connected to the ground station to feedback the transmission information thereto.

3. Apparatus according to claim 1 wherein the first and second transmitter means transmit the error information to the object at the same transmission frequency but in different time slots.

4. Apparatus according to claim 3 wherein the object is an aircraft having a receiver, the first and second transmitter means are located proximate a first airport and the first and second positions are chosen to provide the error information to the aircraft free of obscuration by interfering structures.

5. Apparatus according to claim 3 wherein the parameters include satellite specific pseudo range error, and other airport data for use by the aircraft in landing at the airport and taxiing to its terminal.

6. Apparatus according to claim 3 wherein the object is an aircraft having a receiver and the first and second transmitter means are located at separate airports within a normal transmission range of each other, the error information being provided at different times so that the aircraft can determine the location of the transmitter without using multiple frequencies.

7. Apparatus according to claim 6 wherein the parameters include range error, rate of range error and other airport data for use by the aircraft in landing at a chosen one of the airports and taxing to its terminal.

8. A process for use with a differential global position system in which information from a plurality of satellites is received at a ground station and processed to determine any errors therein and the processed information being transmitted to aircraft within transmission range of the ground station, an improvement permitting transmission of the processed information over a single frequency from several locations remote from the ground station and from each other all within the transmission range comprising the steps of:

- A. connecting a single ground station to a plurality of transmitters, at least one of which is located at each of the remote locations;
- B. assigning to each transmitter a separate time slot for the transmission of the processed information; and
- C. causing each transmitter to transmit the processed information at the single frequency only during its assigned time slot.

9. The process of claim 8 wherein the transmission of the processed information by the transmitters during each time slot is periodically repeated.

10. The process of claim 8 further including the step of positioning the transmitters so that an unobscured obscured transmission to the aircraft is possible from at least one transmitter at all aircraft positions.

11. The process of claim 8 further including the step of monitoring the transmissions of the plurality of transmitters and feeding the transmissions back to the ground station.

12. The process of claim 8 where the aircraft can receive the corrections from two transmitters on a single frequency so as to maintain the signal when one or the other transmitter is masked or interfered with.

13. The process of claim 8 where the aircraft can receive the corrections from two transmitters on a single frequency so as to maintain the signal when a highly reliable link must remain active as when used in CAT 111 B approaches.

* * * * *